United States Patent
Dao et al.

(10) Patent No.: US 8,838,620 B2
(45) Date of Patent: Sep. 16, 2014

(54) PREDICTIVE DATA OBJECT RETRIEVAL

(75) Inventors: Quyen C. Dao, Dillsburg, PA (US); William D. Reeves, Mechanicsburg, PA (US); Paul Snyder, Jerseyville, IL (US); Mark A. VanderPloeg, Glendale, AZ (US)

(73) Assignee: International Business Machines Corporation, Armonk, NY (US)

( * ) Notice: Subject to any disclaimer, the term of this patent is extended or adjusted under 35 U.S.C. 154(b) by 1176 days.

(21) Appl. No.: 11/347,404

(22) Filed: Feb. 3, 2006

(65) Prior Publication Data

US 2007/0185933 A1   Aug. 9, 2007

(51) Int. Cl.
*G06F 7/00* (2006.01)
*G06F 3/06* (2006.01)
*G06F 17/30* (2006.01)
*G06F 12/08* (2006.01)

(52) U.S. Cl.
CPC .......... *G06F 12/0862* (2013.01); *G06F 3/0649* (2013.01); *G06F 12/0866* (2013.01); *G06F 3/061* (2013.01); *G06F 3/0685* (2013.01); *G06F 2212/6024* (2013.01)
USPC .......................................... 707/751; 768/768

(58) Field of Classification Search
USPC .......... 707/2, 204, 3, 751, 768; 711/113, 141, 711/120, 121; 714/6; 718/102
See application file for complete search history.

(56) References Cited

U.S. PATENT DOCUMENTS

| 6,026,391 | A | * | 2/2000 | Osborn et al. ..................... 707/2 |
| 6,434,682 | B1 |   | 8/2002 | Ashton et al. |
| 7,031,958 | B2 | * | 4/2006 | Santosuosso ..................... 707/3 |
| 7,702,682 | B2 | * | 4/2010 | De Angelo ..................... 707/758 |
| 7,801,894 | B1 | * | 9/2010 | Bone et al. ..................... 707/737 |
| 7,844,582 | B1 | * | 11/2010 | Arbilla et al. ..................... 707/694 |
| 7,912,851 | B2 | * | 3/2011 | Barsness et al. ............... 707/768 |
| 2003/0084030 | A1 | * | 5/2003 | Day et al. .......................... 707/3 |
| 2004/0093338 | A1 |   | 5/2004 | Akelbein et al. |
| 2007/0050609 | A1 | * | 3/2007 | Ferren et al. .................. 712/227 |
| 2007/0074173 | A1 | * | 3/2007 | Ferren et al. .................. 717/127 |
| 2007/0110408 | A1 | * | 5/2007 | Chang et al. .................. 386/126 |
| 2007/0143246 | A1 | * | 6/2007 | Bestgen et al. .................... 707/2 |
| 2011/0173429 | A1 | * | 7/2011 | Hollis .............................. 713/2 |

OTHER PUBLICATIONS

Bernstein, P.A. et al., "Context-based prefetch—an optimization for implementing objects on relations," The VLDB Journal (2000), pp. 177-189.

Kraiss, A. et al., "Integrated document caching and prefetching in storage hierarchies based on Markov-chain predictions," The VLDB Journal (1998), pp. 141-162.

Song, J. et al., "Efficient Retrieval of Composite Multimedia Objects in the JINSIL Distributed System," Sigmetrics '97, Seattle, WA, pp. 260-271.

* cited by examiner

*Primary Examiner* — Jacob F Bétit
*Assistant Examiner* — Bao Tran
(74) *Attorney, Agent, or Firm* — Lisa Ulrich; Hoffman Warnick LLC (57) ABSTRACT

A solution for managing data in which historical execution information for a process is used to determine a set of data requirements for the process. The set of data requirements is then used to move data for the process from a slower storage device (e.g., a magnetic tape) to a faster storage device (e.g., a hard drive) before the process requests the data object (e.g., prefetch). In this manner, the prefetched data can be provided when requested by the process without delaying its execution while the data is moved from the slower storage device to the faster storage device.

26 Claims, 3 Drawing Sheets

PREDICTIVE DATA OBJECT RETRIEVAL

FIELD OF THE INVENTION

The invention relates generally to storage management, and more particularly, to a solution for prefetching data for a process.

BACKGROUND OF THE INVENTION

A storage management solution frequently moves a data object between a slower storage device (e.g., offline/nearline device) and a more expensive and/or more constrained, faster storage device (e.g., online/direct access device). Use of the slower storage device enables a system to store a larger amount of data objects at a reduced cost. As a process executes, it will request data object(s) from the storage management solution when the data object is required. In the current storage management solutions, the storage management solution will move the data object from a slower storage device to a faster storage device in response to the request. While the data object is being moved, the execution of the process is halted since data object movement between storage devices is much slower than other execution activities. For some processes, such as a critical process, the time delay between when the data object is requested and when it is available for use presents an undesirable constraint.

In order to address this problem, some storage management solutions include customized functionality to retrieve a specific data object from a slower storage device and store it in a faster storage device before it is required by an executing process. For example, a particular process can be analyzed by an administrator, who can specify one or more required data objects, which are moved prior to the process executing. However, due to its customization and the constant manual intervention required to make the functionality work, this functionality is cumbersome to implement and difficult to keep current. In view of the foregoing, there exists a need in the art to overcome one or more of the deficiencies indicated herein.

SUMMARY OF THE INVENTION

The invention provides a solution for managing data in which historical execution information for a process is used to determine a set of data requirements for the process. The set of data requirements is then used to move data for the process from a slower storage device (e.g., a magnetic tape) to a faster storage device (e.g., a hard drive) before the process requests the data object (e.g., prefetch). Subsequently, the data can be staged onto the faster storage device until the process completes executing. In this manner, the prefetched data can be provided when requested by the process without delaying its execution while the data is moved from the slower storage device to the faster storage device. In one embodiment, the invention is implemented as part of a hierarchical storage management (HSM) system, and electronic files are prefetched for a process that is predicted to execute. The predicted execution can be based on an execution schedule and/or historical execution information. The historical execution information can be generated and maintained by an operating system. For example, the historical execution information can comprise Systems Management Facility (SMF) data for the process. As a result, the invention uses historical execution information, such as knowledge of the duration, frequency, and/or other system events, for a process to forecast an execution of the process and/or the set of data requirements for the process. The forecast is then used to move data object(s) onto faster storage device(s) prior to the process requesting the data object(s).

A first aspect of the invention provides a method of managing data, the method comprising: obtaining historical execution information for a process; determining a set of data requirements for the process based on the historical execution information; and moving a data object included in the set of data requirements from a first storage device to a second storage device that is faster than the first storage device before the process requests the data object.

A second aspect of the invention provides a system for managing data, the system comprising: a system for obtaining historical execution information for a process; a system for determining a set of data requirements for the process based on the historical execution information; and a system for moving a data object included in the set of data requirements from a first storage device to a second storage device that is faster than the first storage device before the process requests the data object.

A third aspect of the invention provides a hierarchical storage management (HSM) system comprising: a system for obtaining historical execution information for a process; a system for determining a set of data requirements for the process based on the historical execution information; and a system for moving an electronic file included in the set of data requirements from a first storage device to a second storage device that is faster than the first storage device before the process requests the data object.

A fourth aspect of the invention provides a program product stored on a computer-readable medium, which when executed, enables a computer infrastructure to manage data, the program product comprising computer program code for enabling the computer infrastructure to: obtain historical execution information for a process; determine a set of data requirements for the process based on the historical execution information; and move a data object included in the set of data requirements from a first storage device to a second storage device that is faster than the first storage device before the process requests the data object.

A fifth aspect of the invention provides a method of generating a system for managing data, the method comprising: providing a computer infrastructure operable to: obtain historical execution information for a process; determine a set of data requirements for the process based on the historical execution information; and move a data object included in the set of data requirements from a first storage device to a second storage device that is faster than the first storage device before the process requests the data object.

A sixth aspect of the invention provides a business method for managing data, the business method comprising managing a computer infrastructure that performs the process described herein; and receiving payment based on the managing.

The illustrative aspects of the present invention are designed to solve the problems herein described and other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

As indicated above, the invention provides a solution for managing data in which historical execution information for a process is used to determine a set of data requirements for the process. The set of data requirements is then used to move data for the process from a slower storage device (e.g., a magnetic tape) to a faster storage device (e.g., a hard drive) before the process requests the data object (e.g., prefetch). Subsequently, the data can be staged onto the faster storage device until the process completes executing. In this manner, the prefetched data can be provided when requested by the process without delaying its execution while the data is moved from the slower storage device to the faster storage device. In one embodiment, the invention is implemented as part of a hierarchical storage management (HSM) system, and electronic files are prefetched for a process that is predicted to execute. The predicted execution can be based on an execution schedule and/or historical execution information. The historical execution information can be generated and maintained by an operating system. For example, the historical execution information can comprise Systems Management Facility (SMF) data for the process. As a result, the invention uses historical execution information, such as knowledge of the duration, frequency, and/or other system events, for a process to forecast an execution of the process and/or the set of data requirements for the process. The forecast is then used to move data object(s) onto faster storage device(s) prior to the process requesting the data object(s). As used herein, unless otherwise noted, the term "set" means one or more.

Figure 1:
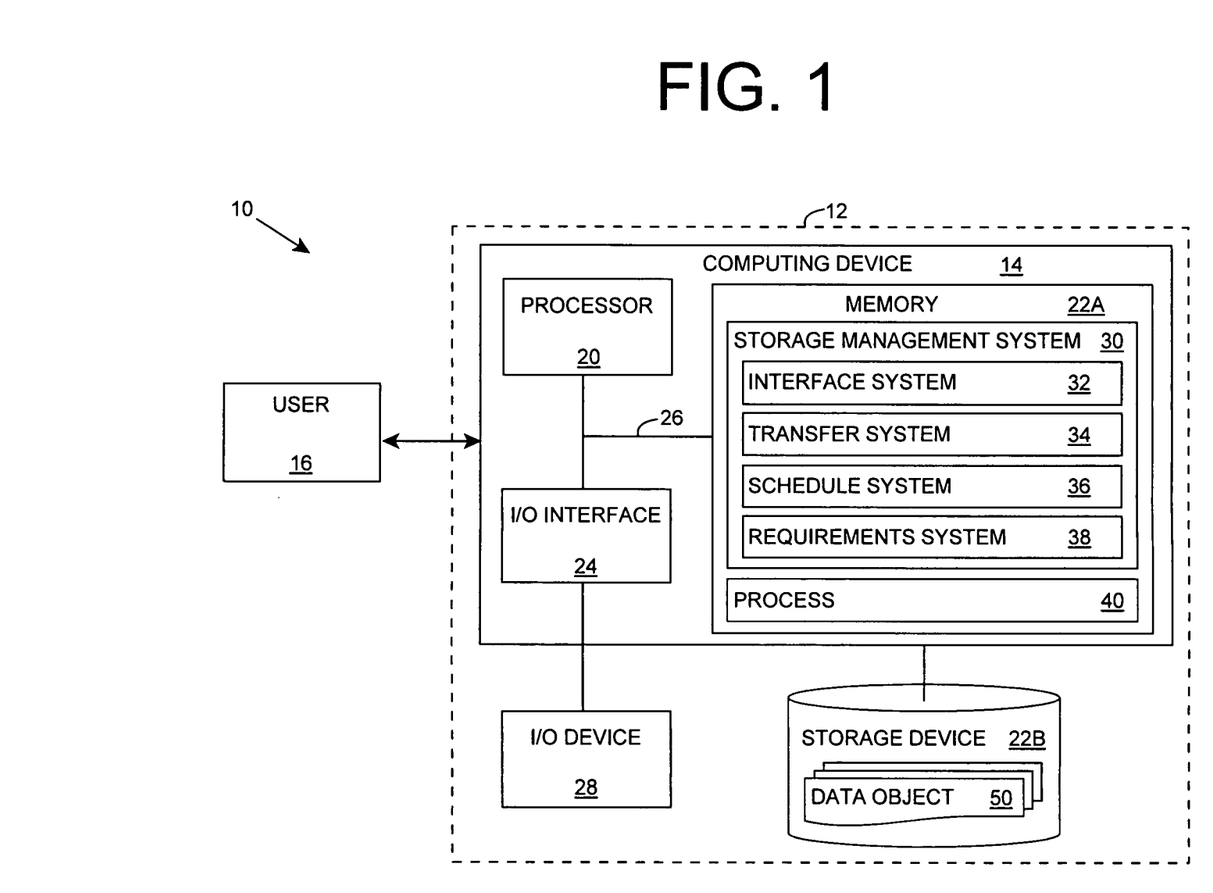
FIG. 1 shows an illustrative environment for managing data according to an embodiment of the invention.

Turning to the drawings, FIG. 1 shows an illustrative environment 10 for managing data, such as a set of data objects 50, according to an embodiment of the invention. To this extent, environment 10 includes a computer infrastructure 12 that can perform the process described herein in order to manage data objects 50. In particular, computer infrastructure 12 is shown including a computing device 14 that comprises a storage management system 30, which makes computing device 14 operable to manage data objects 50 by performing the process described herein.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as process 40, which is stored in memory 22A and/or storage system 22B. While executing computer program code, processor 20 can read and/or write data, such as data object 50, to/from memory 22A, storage system 22B, and/or I/O interface 24. Bus 26 provides a communications link between each of the components in computing device 14. I/O device 28 can comprise any device that enables an individual to interact with computing device 14 or any device that enables computing device 14 to communicate with one or more other computing devices using any type of communications link.

In any event, computing device 14 can comprise any general purpose computing article of manufacture capable of executing computer program code installed thereon (e.g., a personal computer, server, etc.). However, it is understood that computing device 14 and storage management system 30 are only representative of various possible equivalent computing devices that may perform the process described herein. To this extent, in other embodiments, the functionality provided by computing device 14 and storage management system 30 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of communications link, such as a network, a shared memory, or the like, to perform the process described herein. Further, while performing the process described herein, one or more computing devices in computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, storage management system 30 enables computer infrastructure 12 to manage data, such as data object 50, for various processes 40 executing in environment 10. To this extent, storage management system 30 is shown including an interface system 32, a transfer system 34, a schedule system 36, and a requirements system 38. Operation of each of these systems is discussed further herein. However, it is understood that some of the various systems shown in FIG. 1 can be implemented independently, combined, and/or stored in memory for one or more separate computing devices that are included in computer infrastructure 12. Further, it is understood that some of the systems and/or functionality may not be implemented, or additional systems and/or functionality may be included as part of computer infrastructure 12.

Regardless, the invention provides a solution for managing data for a set of processes 40. To this extent, it is understood that, while the invention can be implemented in environment 10, the invention also can be implemented in a more complex environment. For example, computing device 14 can comprise a server that includes multiple processors 20, each of which can be executing a unique process 40. Further, process 40 can execute on a different computing device 14 in computer infrastructure 12 from storage management system 30. In the latter case, storage management system 30 could manage data for multiple processes 40 executing on multiple computing devices 14 in computer infrastructure 12. To this extent, storage management system 30 can provide data object 50 for use by process 40 over any combination of communications links, including one or more public/private networks.

In any event, as process 40 executes, it may require access to one or more data objects 50. In this case, interface system 32 can receive a request for data object(s) 50 from process 40. In response to the request, interface system 32 can provide data object(s) 50 for use by process 40. For example, a data object 50 can comprise an electronic file stored in a file system. In this case, interface system 38 can read data object 50 from storage device 22B (e.g., a fixed storage device such as a hard drive), and provide the data for use by process 40.

However, for a large file system, storage management system 30 can comprise a hierarchical storage management (HSM) system. In this case, a plurality of "levels" of storage devices 22B can be used to store data object(s) 50. Each level of storage devices 22B comprises a set of storage devices 22B from which data object(s) 50 can be retrieved in a similar time period. For example, an HSM system can comprise: a set of "level zero" (e.g., online) storage devices 22B, each of which comprises a hard drive; a set of "level one" (e.g., nearline) storage devices 22B, each of which comprises an optical disk, a direct access storage device (DASD), or the like; and a set of "level two" (e.g., offline) storage devices 22B, each of which comprises a magnetic tape or the like. In general, accessing a data object 50 stored in a level zero storage device 22B is faster than accessing a data object 50 stored in a level one storage device 22B, which in turn is faster than accessing a data object 50 stored in a level two storage device 22B. However, each slower level generally can provide more storage space for less cost. As a result, an HSM system can provide more total storage space in computer infrastructure 12 at a lower cost than if all level zero storage devices 22B are used.

When a requested data object 50 is not stored in a level zero storage device 22B, transfer system 34 can move data object 50 from the slower storage device 22B to a faster storage device 22B (e.g., a level zero storage device 22B) prior to interface system 32 providing data object 50 for use by process 40. In this case, the execution of process 40 will be delayed while transfer system 34 moves data object 50 between the storage levels. For some processes 40, such as a critical process, this delay is undesirable.

Figure 2:
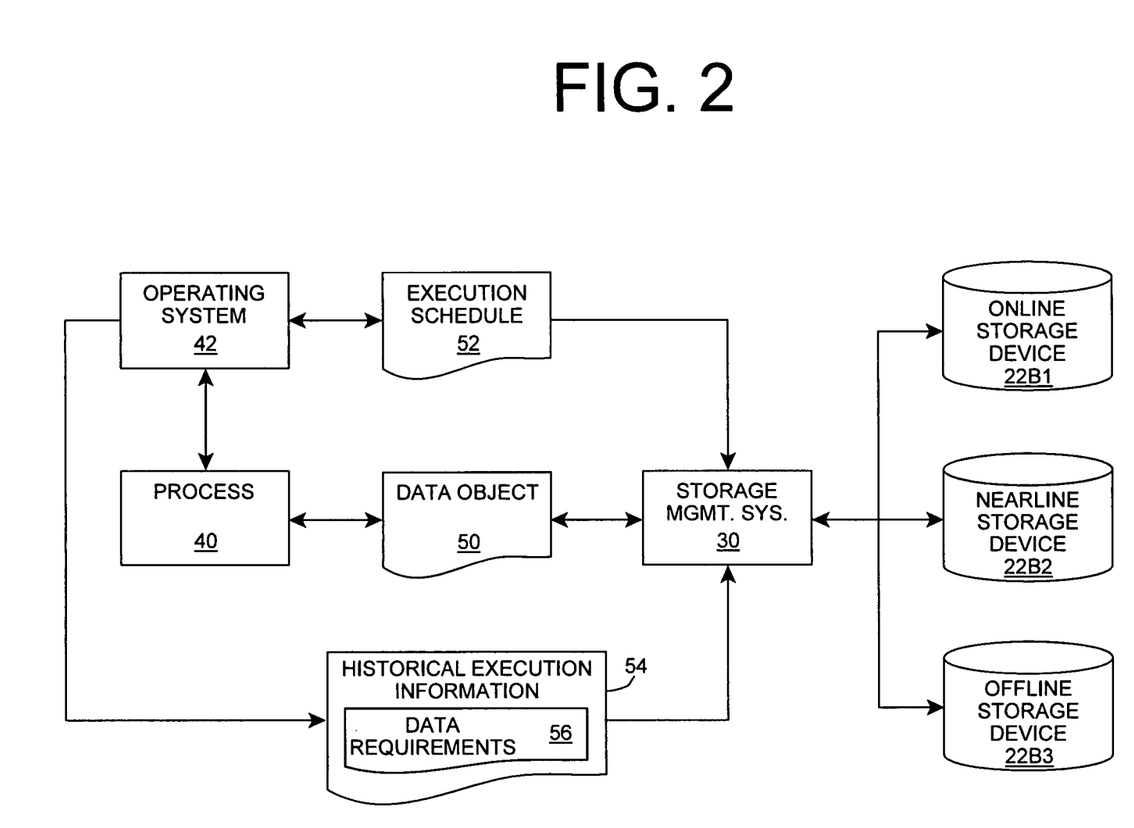
FIG. 2 shows an illustrative data flow diagram between various systems according to an embodiment of the invention.

To reduce the number of times that execution of process 40 is delayed, transfer system 34 can move data object 50 from a slower storage device 22B to a faster storage device 22B before process 40 requests data object 50 (e.g., prefetch data object 50). To this extent, FIG. 2 shows an illustrative data flow diagram between various systems according to an embodiment of the invention. As shown, storage management system 30 can manage a hierarchy of storage devices 22B1-3 comprising an online storage device 22B1, a nearline storage device 22B2, and an offline storage device 22B3. In general, operating system 42 can comprise a scheduler or the like that schedules process 40 for execution. To this extent, process 40 can be included in an execution schedule 52 maintained by operating system 42 (e.g., the scheduler), which comprises a list of processes 40 to be executed. Process 50 may be scheduled for execution using a transaction processing solution (e.g., when requested to execute by another process and/or user) and/or a batch processing solution (e.g., execute at midnight every day).

Referring to FIGS. 1 and 2, schedule system 36 can predict that process 40 will execute at a particular time. In one embodiment, schedule system 36 can obtain historical execution information 54 for process 40 and predict an execution time for process 40 based on historical execution information 54. For example, historical execution information 54 may indicate that process 40 has executed at approximately midnight every day for the past month. Alternatively, historical execution information 54 may indicate that process 40 has executed at a particular time a certain percentage of the time, e.g., at 7:00 AM sixty percent of the time. In either case, schedule system 36 can predict both a time and probability that process 40 will execute.

Alternatively, schedule system 36 can read execution schedule 52, which can comprise an identifier for process 40 and a corresponding time for the execution of process 40. Additionally, schedule system 36 can determine an estimated execution time for process 40 based on a number of other processes in execution schedule 52, a priority of process 40, and/or the like. In the latter two cases, since process 40 is scheduled to execute, its predicted execution probability would comprise one hundred percent. Further, transfer system 34 can prefetch data object(s) 50 for only a subset of all processes 40 executing. In this case, schedule system 36 can determine whether data object(s) 50 for process 40 should be prefetched by transfer system 34. For example, schedule system 36 can determine whether process 40 comprises a critical process 40. If so, then transfer system 34 can prefetch data object(s) 50.

In any event, when prefetching data object(s) 50 for process 40 is desired, requirements system 38 can determine a set of data requirements 56 for process 40. In one embodiment, requirements system 38 can obtain historical execution information 54 for process 40, from which requirements system 38 can predict/forecast the set of data requirements 56 for process 40. In general, each time operating system 42 executes process 40, operating system 42 can update historical execution information 54, which can include data (e.g., a set of execution records) on previous executions of process 40. For example, operating system 42 can update historical execution information 54 with data from various logs of the requirements of process 40 during execution, such as its storage (data), security, resource utilization, execution, and/or the like, requirements. In this manner, operating system 42 can build up a knowledgebase of the historical execution(s) of process 40. In one embodiment, historical execution information 54 comprises Systems Management Facility (SMF) data that is maintained by operating system 42. Regardless, requirements system 38 can determine the set of data requirements 56 for process 40 based on historical execution information 54 using any solution. For example, requirements system 38 can analyze historical execution information 54 to determine the data object(s) 50 that were requested the last X number of times process 40 executed, data object(s) 50 that are most frequently requested by process 40, and/or the like.

Over time, requirements system 38 can manage a knowledgebase of the set of data requirements 56 for process 40. In particular, as the number of executions of process 40 increases, a pattern is developed that defines the set of data requirements 56 in terms of data object(s) 50 and/or the frequency of execution for each process 40. Requirements system 38 can separately store and manage this knowledgebase and use it to predict future executions of process 40 and/or the set of data requirements 56 of process 40. Further, requirements system 38 can use additional/alternative solutions for predicting the set of data requirements 56 of process 40. To this extent, requirements system 38 can analyze process 40 to determine the set of data requirements 56. For example, when process 40 has not been executed frequently, requirements system 38 can analyze process 40 and determine the data object(s) 50 that may potentially be required in a future execution. Subsequently, some or all of data object(s) 50 can be added to the set of data requirements 56. Additionally, requirements system 38 can generate a user interface, provide a application program interface (API), and/or the like, that enables a user 16 (e.g., a human or another system) to define the set of data requirements 56. In this case, user 16 can specify that one or more data objects 50 should be included and/or excluded from the set of data requirements 56.

In any event, transfer system 34 moves a set of data objects 50 for process 40 based on its corresponding set of data requirements 56 before process 40 requests any data object(s) 50. For example, transfer system 34 can move data object 50 from offline storage device 22B3 to nearline storage device 22B2 and/or online storage device 22B1. Similarly, transfer system 34 can move data object 50 from nearline storage device 22B2 to online storage device 22B1. The destination storage device 22B1-2 and/or amount of the prefetched data object(s) 50 that is prefetched can be determined based on a likelihood that process 40 will request data object 50, a relative criticality of process 40, an available amount of storage space at each storage device 22B1-2, and/or the like. For example, for a process 40 that always executes and requests an entire data object 50, data object 50 can be moved to online storage device 22B1. Conversely, for a highly critical process that frequently executes (e.g., sixty percent of the time) but only occasionally (e.g., forecasted to occur ten percent of the time) requires a particular data object 50, the data object 50 could be prefetched to nearline storage device 22B2. Similarly, if process 40 has a high probability of executing (e.g., forecasted to execute more than half the time) and is forecasted to require a very large data object 50, then some or all of data object 50 can be prefetched to nearline storage device 22B2 while some of data object 50 can remain on offline storage device 22B3.

In addition to prefetching data object(s) 50, transfer system 34 can move data object(s) 50 that have been requested by currently executing process(es) 40 (e.g., from slower to faster storage device(s)) and/or move data object(s) 50 that have been used by completed process(es) 40 (e.g., from faster to slower storage device(s)). To this extent, transfer system 34 can perform the prefetching at a lower priority than moving data object(s) 50 for currently executing process(es) 40. Additionally, transfer system 34 can stage the prefetched data object(s) 50 onto the faster storage device 22B1-2 until process 40 executes. To this extent, transfer system 34 also can ensure that the prefetched data object(s) 50 do not get moved to create space for data object(s) 50 required by other process (es) 40. In particular, transfer system 34 can stage the prefetched data object(s) 50 until process 40 completes executing, until the predicted execution start time (plus any forecasted delay interval) passes, and/or until the likelihood of execution of process 40 falls below a threshold level.

Further, transfer system 34 can perform the prefetching in a "just-in-time" fashion. In this manner, transfer system 34 can reduce a number of data objects 50 that require staging and/or a total amount of time that data objects 50 are required to be staged. In one embodiment, transfer system 34 can identify a time at which to start to prefetch data object(s) 50 based on a prefetch time interval and a time at which process 40 is scheduled to execute. For example, user 16 can provide the prefetch time interval, which specifies an amount of time before the execution of process 40 that data object(s) 50 should be prefetched. User 16 can select the prefetch time interval based on, for example, a maximum amount of time that will be required for the prefetch operation.

Alternatively, transfer system 34 can determine the prefetch time interval. In particular, once a quantity of data for data object(s) 50 to be prefetched and the source and destination storage device(s) 22B1-3 for the prefetching are known, transfer system 34 can determine the prefetch time interval as an amount of time required to move the data for data object(s) 50 from the slower (source) storage device 22B2-3 to the faster (destination) storage device 22B1-2. In any event, transfer system 34 can calculate the time at which to start prefetching data object(s) 50 by, for example, subtracting the prefetch time interval from the predicted execution time (plus any forecasted system delays). It is understood that, when process 40 has not executed frequently, transfer system 34 may use a prefetch time interval that is too large (resulting in additional staging) and/or too small (resulting in execution delay). Additionally, schedule system 36 may predict an inaccurate execution time and/or probability. However, as a number of executions of process 40 increases, schedule system 36 can adjust the predicted execution time and/or probability, and/or transfer system 34 can adjust the prefetch time interval to obtain more accurate results.

Regardless, operating system 42 can execute process 40. While executing, process 40 can request data object 50 from storage management system 30. In response, interface system 32 can provide data object 50 for use by process 40. When transfer system 34 has prefetched data object 50, interface system 32 can provide data object 50 without incurring an additional delay to move data object 50. In this manner, the execution of process 40 is not delayed unnecessarily. Subsequently, once process 40 completes executing, transfer system 34 can move data object 50 from the faster storage device 22B1-2 to a slower storage device 22B2-3 in order to free storage space on the faster storage device 22B1-2.

Figure 3:
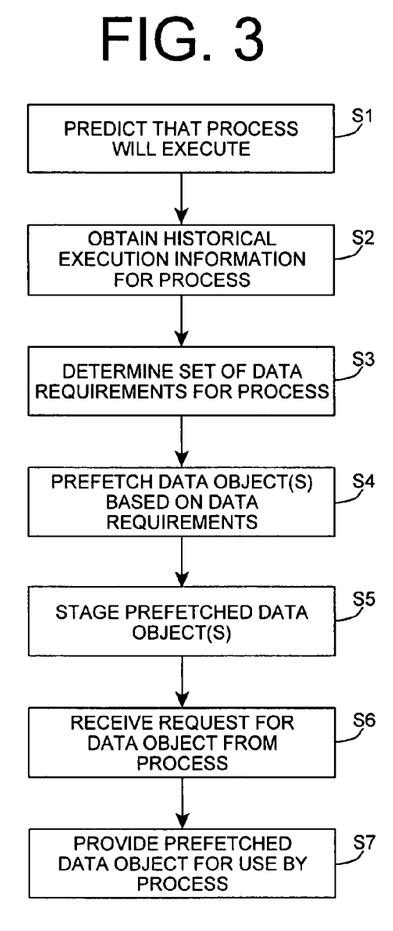
FIG. 3 shows an illustrative process that can be implemented to manage data according to an embodiment of the invention.

As discussed herein, an embodiment of the invention provides a method of managing data. To this extent, FIG. 3 shows an illustrative process that can be implemented by, for example, computer infrastructure 12 of FIG. 1, to manage data according to an embodiment of the invention. Referring to FIGS. 1 and 3, in step S1, schedule system 36 forecasts that process 40 will execute. In step S2, requirements system 38 obtains historical execution information 54 (FIG. 2) for process 40. In step S3, requirements system 38 determines a set of data requirements 56 (FIG. 2) for process 40 based on historical execution information 54. For example, requirements system 38 can manage a knowledgebase for process 40 based on previous evaluations of historical execution information 54, and leverage the knowledgebase in determining the set of data requirements 56. In step S4, transfer system 34 prefetches a set of data objects 50 from a slower storage device 22B to a faster storage device 22B based on the set of data requirements 56. In step S5, transfer system 34 stages the prefetched set of data objects 50 onto the faster storage device 22B. In step S6, interface system 32 receives a request from process 40 for one of the set of data objects 50, and in step S7, interface system 32 provides the prefetched data object 50 for use by process 40.

It is understood that the steps and the corresponding order shown in FIG. 3 are only illustrative. To this extent, two or more steps can be performed simultaneously, the order can be altered, one or more additional steps can be performed, and/or one or more steps can be removed without departing from the invention described herein. For example, after process 40 has executed, requirements system 38 can analyze historical execution information 54 to update the knowledgebase for process 40. Additionally, when data object 50 is not forecasted to be required by a process 40, transfer system 34 can move data object 50 to a slower storage device. To this extent, the claimed invention is not limited by the particular configuration of steps shown and described herein.

Returning to FIG. 2, as used herein, data object 50 can comprise any group of related data that is stored in storage device(s) 22B1-3. For example, data object 50 can comprise an electronic file stored in a file system. However, it is understood that data object 50 can comprise a portion of the related data, e.g., a sector of data for an electronic file. To this extent, process 40 may request only a portion of all of the data in an electronic file and/or transfer system 34 may only prefetch a portion of all of the data in an electronic file. Regardless, it is understood that data object 50 can comprise any other type of storage unit, such as one or more components within a data repository, such as a database, etc.

Additionally, while three levels of storage devices 22B1-3 are shown and described, it is understood that any number of levels of storage devices 22B1-3 can be implemented. Further, storage devices 22B1-3 can comprise any type of storage devices 22B1-3. For example, in another embodiment of the invention, the storage devices can comprise: a cache memory, a main memory, a magnetic storage (e.g., hard) drive, an optical storage device, and/or the like. Still further, it is understood that process 40 represents any type of executable entity, such as an application, a thread, a program module, an electronic transaction, an electronic service request, etc. To this extent, the invention can manage multiple hierarchical storage levels at any computing scale.

While shown and described herein as a method and system for managing data, it is understood that the invention further provides various alternative embodiments. For example, in one embodiment, the invention provides a program product stored on a computer-readable medium, which when executed, enables a computer infrastructure to manage data and/or storage device(s) using historical execution information 54 (FIG. 2). To this extent, the computer-readable medium includes program code, such as storage management system 30 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), and/or the like.

In another embodiment, the invention provides a method of generating a system for managing data and/or storage device (s) using historical execution information 54 (FIG. 2). In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as a storage management provider, could offer to manage data as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement and/or the service provider can receive payment from the sale of advertising to one or more third parties.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing data, the method comprising:
   obtaining historical execution information for a process, the historical execution information for the process including data identifying a set of data objects required for a previous execution of the process, wherein the process is an instance of a program module executing on a computing device;
   determining a set of data requirements for at least one of: a current or a predicted execution of the process based on the historical execution information, wherein the set of data requirements includes data anticipated, but not known, to be required for the process to execute, and wherein the set of data requirements is distinct from the historical execution information;
   moving a data object included in the set of data requirements from a first storage device to a second storage device that is faster than the first storage device before the process requests the data object;
   staging the data object onto the second storage device prior to the process executing, wherein staging includes preventing the movement of the data object from the second storage device to another storage device;
   receiving a request for the data object from the process; and
   providing the moved data object for use by the process in response to the request.

2. The method of claim 1, wherein the data object is staged until at least one of the following occurs: the process completes executing, a predicted execution start time passes, or a likelihood that the process will execute falls below a threshold level.

3. The method of claim 1, the determining including managing a knowledgebase for the process based on the historical execution information.

4. The method of claim 1, further comprising predicting that the process will execute at a first time, based on the historical execution information, the moving starting prior to the first time.

5. The method of claim 4, further comprising identifying a second time, prior to the first time, based on the first time and a prefetch time interval, the moving starting by the second time.

6. The method of claim 5, the identifying including:
determining the prefetch time interval based on an amount of time required to move the data object from the first storage device to the second storage device; and
calculating the second time based on the first time and the prefetch time interval.

7. The method of claim 5, further comprising:
analyzing an execution of the process that used the prefetch time interval; and
adjusting the prefetch time interval based on the analyzing.

8. The method of claim 1, further comprising moving the data object from the second storage device to the first storage device after the process has executed.

9. The method of claim 1, further comprising determining that the process comprises a critical process prior to the obtaining.

10. A computer system for managing data, the computer system comprising:
at least one computing device including:
a system for obtaining historical execution information for a process, the historical execution information for the process including data identifying a set of data objects required for a previous execution of the process, wherein the process is an instance of a program module executing on a computing device;
a system for determining a set of data requirements for at least one of: a current or a predicted execution of the process based on the historical execution information, wherein the set of data requirements includes data anticipated, but not known, to be required for the process to execute, and wherein the set of data requirements is distinct from the historical execution information;
a system for moving a data object included in the set of data requirements from a first storage device to a second storage device that is faster than the first storage device before the process requests the data object;
a system for staging the data object onto the second storage device prior to the process executing, wherein staging includes preventing the movement of the data object from the second storage device to another storage device;
a system for receiving a request for the data object from the process; and
a system for providing the moved data object for use by the process in response to the request.

11. The system of claim 10, wherein the data object is staged until at least one of the following occurs: the process completes executing, a predicted execution start time passes, or a likelihood that the process will execute falls below a threshold level.

12. The system of claim 10, the system for determining including a system for managing a knowledgebase of data requirements for the process based on the historical execution information.

13. The system of claim 10, the at least one computing device further including a system for predicting that the process will execute at a first time, based on the historical execution information.

14. The system of claim 13, the at least one computing device further including a system for identifying a second time, prior to the first time, based on the first time and a prefetch time period.

15. The system of claim 10, the at least one computing device further including a system for moving the data object from the second storage device to the first storage device.

16. The system of claim 10, the at least one computing device further including a system for determining that the process comprises a critical process.

17. The system of claim 10, the data object comprising an electronic file.

18. A hierarchical storage management (HSM) system comprising:
at least one computing device including:
a system for obtaining historical execution information for a process, the historical execution information for the process including data identifying a set of data objects required for a previous execution of the process, wherein the process is an instance of a program module executing on a computing device;
a system for determining a set of data requirements for at least one of: a current or a predicted execution of the process based on the historical execution information, wherein the set of data requirements includes data anticipated, but not known, to be required for the process to execute, and wherein the set of data requirements is distinct from the historical execution information;
a system for moving an electronic file included in the set of data requirements from a first storage device to a second storage device that is faster than the first storage device before the process requests the data object;
a system for staging the electronic file onto the second storage device prior to the process executing, wherein staging includes preventing the movement of the electronic file from the second storage device to another storage device;
a system for receiving a request for the data object from the process; and
a system for providing the moved data object for use by the process in response to the request.

19. The HSM system of claim 18, the historical execution information comprising Systems Management Facility (SMF) data.

20. The HSM system of claim 18, wherein the electronic file is staged until at least one of the following occurs: the process completes executing, a predicted execution start time passes, or a likelihood that the process will execute falls below a threshold level.

21. The HSM system of claim 18, the at least one computing device further including a system for predicting a time when the process will execute based on the historical execution information.

22. A program product stored on a physical computer-readable storage medium, which when executed, enables a computer infrastructure to manage data, the program product comprising computer program code for enabling the computer infrastructure to:
obtain historical execution information for a process, the historical execution information for the process including data identifying a set of data objects required for a previous execution of the process, wherein the process is an instance of a program module executing on a computing device;
determine a set of data requirements for at least one of: a current or a predicted execution of the process based on the historical execution information, wherein the set of data requirements includes data anticipated, but not known, to be required for the process to execute, and wherein the set of data requirements is distinct from the historical execution information;

move a data object included in the set of data requirements from a first storage device to a second storage device that is faster than the first storage device before the process requests the data object;

stage the data object onto the second storage device prior to the process executing, wherein the staging includes preventing the movement of the data object from the second storage device to another storage device;

receive a request for the data object from the process; and provide the moved data object for use by the process in response to the request.

23. The program product of claim 22, wherein the data object is staged until at least one of the following occurs: the process completes executing, a predicted execution start time passes, or a likelihood that the process will execute falls below a threshold level.

24. The program product of claim 22, further comprising program code for enabling the computer infrastructure to determine that the process comprises a critical process.

25. The program product of claim 22, further comprising program code for enabling the computer infrastructure to predict a time when the process will execute, based on the historical execution information.

26. A method of generating a system for managing data, the method comprising:

providing a computer infrastructure operable to:

obtain historical execution information for a process, the historical execution information for the process including data identifying a set of data objects required for a previous execution of the process, wherein the process is an instance of a program module executing on a computing device;

determine a set of data requirements for at least one of: a current or a predicted execution of the process based on the historical execution information, wherein the set of data requirements includes data anticipated, but not known, to be required for the process to execute, and wherein the set of data requirements is distinct from the historical execution information;

move a data object included in the set of data requirements from a first storage device to a second storage device that is faster than the first storage device before the process requests the data object;

stage the data object onto the second storage device prior to the process executing, wherein the staging includes preventing the movement of the data object from the second storage device to another storage device;

receive a request for the data object from the process; and provide the moved data object for use by the process in response to the request.

\* \* \* \* \*